(12) United States Patent
Chang et al.

(10) Patent No.: US 11,767,271 B2
(45) Date of Patent: Sep. 26, 2023

(54) POROUS MATERIAL AND METHOD FOR PREPARING THE SAME

(71) Applicant: INDUSTRIAL TECHNOLOGY RESEARCH INSTITUTE, Hsinchu (TW)

(72) Inventors: Ming-Hui Chang, Hsinchu (TW); Sheng-Min Yu, Hsinchu (TW); Hsiu-Hsia Lee, Hsinchu (TW); Chien-Chung Hsu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 449 days.

(21) Appl. No.: 17/026,471

(22) Filed: Sep. 21, 2020

(65) Prior Publication Data
US 2021/0221746 A1 Jul. 22, 2021

(30) Foreign Application Priority Data

Jan. 17, 2020 (TW) ................. 109101841

(51) Int. Cl.
*C04B 38/00* (2006.01)
*C21B 3/04* (2006.01)

(52) U.S. Cl.
CPC ...... *C04B 38/0032* (2013.01); *C04B 38/0009* (2013.01); *C04B 38/0054* (2013.01); *C21B 3/04* (2013.01)

(58) Field of Classification Search
CPC ............ C04B 38/0032; C04B 38/0009; C04B 38/0054; C04B 5/065; C04B 38/0025; C21B 3/04; C21B 3/08
See application file for complete search history.

(56) References Cited

U.S. PATENT DOCUMENTS

| | | | |
|---|---|---|---|
| 5,312,582 A * | 5/1994 | Donado | B22F 3/101 419/45 |
| 6,410,160 B1 | 6/2002 | Landin et al. | |
| 9,468,887 B2 | 10/2016 | Ramberg et al. | |
| 2014/0364302 A1 | 12/2014 | Ramberg et al. | |

FOREIGN PATENT DOCUMENTS

| | | |
|---|---|---|
| CN | 100391828 | 6/2008 |
| CN | 101370746 | 2/2009 |
| CN | 104032059 | 9/2014 |
| CN | 104150525 | 11/2014 |
| CN | 105506335 | 4/2016 |
| CN | 105506336 | 4/2016 |
| CN | 105523774 | 4/2016 |
| CN | 106735161 | 5/2017 |
| TW | 397718 | 7/2000 |
| TW | 397718 A * | 7/2000 |
| TW | I570245 | 2/2017 |
| TW | 201840360 | 11/2018 |
| TW | I658864 | 5/2019 |

OTHER PUBLICATIONS

Taiwanese Office Action for Taiwanese Patent Application No. 109101841 dated Oct. 22, 2020.
Sun, et al. "Sintering preparation of porous sound-absorbing materials from steel slag", Trans. Nonferrous Met. Soc. China, 20141228, 2015, v 25, 2230-2240.
Chinese Office Action for Chinese Patent Application No. 202010205311.7 dated May 30, 2022.
Liu, et al. "Fabrication and characterization of porous cordierite ceramics prepared from ferrochromium slag", Ceramics International, Sep. 4, 2015, 2016, v 42, 734-742.
Huang, et al. "Synthesis of mesoporous silicon from industrial waste sodium-based slag", Materials Letters Jun. 6, 2018, v228, 187-190.

* cited by examiner

*Primary Examiner* — Kumar R Bhushan (74) *Attorney, Agent, or Firm* — AMIN, TUROCY & WATSON, LLP (57) ABSTRACT

A porous material including a composite oxide body containing calcium oxide, iron oxide, and silica, and a plurality of inter-connecting microchannel structures is provided. A preparing method of porous material is further provided. With the inter-connecting microchannel structures of the porous material and the advantages of high porosity and large specific surface area, the porous material has a bright prospect in the fields of catalysts, filters, adsorption materials, and fuel carriers.

20 Claims, 8 Drawing Sheets

POROUS MATERIAL AND METHOD FOR PREPARING THE SAME

CROSS-REFERENCE TO RELATED APPLICATION

The present application is based on, and claims priority from, Taiwan Application Serial Number 109101841, filed on Jan. 17, 2020, the disclosure of which is hereby incorporated by reference herein in its entirety.

TECHNICAL FIELD

The present disclosure relates to a porous material including composite oxides and a preparation method thereof.

BACKGROUND

With the development of processing technology, porous materials, which have the characteristics of high specific surface areas and good energy absorption due to a large number of internal pore structures, are a kind of high-performance material with both structural and functional characteristics, and can be widely applied in sound-absorbing damping materials, filter separation devices, porous electrodes, sensors, catalysts, capacitors, heat exchangers, etc.

However, the existing porous materials are still unable to meet the practical application needs. Therefore, in order to improve the efficiency of porous materials and reduce the cost consumption of materials, it is necessary to continuously develop the raw materials for preparation of porous materials and to improve the porosity and structure of porous materials to meet the application needs of diversification.

In the methods for producing porous materials reported in literature, a liquid-phase method, a powder sintering method or a metal deposition method is commonly used if metals are used as raw materials; and sintering aids or pore-forming agents are used as the main pore forming methods if ceramic materials are used as raw materials; however, there are many problems in the above preparation techniques, such as excessively large pore diameter, contamination caused by additives, complex preparation procedures, high process cost and difficulties in large-scale production.

In view of the foregoing, it is necessary to develop a porous material and a cost-effective method for preparation of a porous material, so as to meet needs of the current application and production.

SUMMARY

The present disclosure provides a porous material, which includes: a composite oxide body including calcium oxide, iron oxide and silica; and a plurality of microchannel structures formed in the composite oxide body and extending to the surface of the composite oxide body, wherein each of the microchannel structures includes main channels and branched channels extending from the main channels in a lateral direction and connecting thereto, wherein the main channels have an average channel diameter larger than those of the branched channels.

The present disclosure further provides a method for preparing a porous material, which includes the steps of: performing a pore-forming process for at least once including a reduction reaction on composite oxide powder including calcium oxide, iron oxide and silica at a temperature of 1,000° C. or below 1,000° C., wherein the reduction reaction is carried out by contacting the composite oxide powder with a reducing gas stream to form the porous material.

BRIEF DESCRIPTION OF DRAWINGS

The implementation modes of the present disclosure will be described through exemplary drawings.

DETAILED DESCRIPTION

The implementation modes of the present disclosure will be illustrated in the following specific embodiments, anyone skilled in the art can easily realize the advantages and effects of the present disclosure based on the disclosure of the present specification. The present disclosure can also be performed or applied by other different implementation modes, and each of the details in the present specification each can be differently modified and altered based on different views and applications, without departing from the spirit of the present disclosure. Furthermore, all of the ranges and values herein are inclusive and combinable. Any value or point fallen within the disclosed herein, such as any integers, can be used as the lower or upper limit to derive a subrange.

According to the present disclosure, a porous material is provided, which includes: a composite oxide body including calcium oxide, iron oxide and silica; and a plurality of microchannel structures formed in the composite oxide body and extending to the surface of the composite oxide body, wherein each of the microchannel structures includes main channels and branched channels extending from the main channel in a lateral direction and connecting to thereof, wherein the main channels have an average channel diameter larger than those of the branched channels.

The term "composite oxide body" is a framework with the microchannel structures formed by multiple oxide components, and has excellent channel structural intensity than a single metal oxide or a single metal material, due to the inclusion of the composite oxides. In application, it can be optional to make a modification to or provide other active ingredients on the surface of the composite oxide body.

In the porous material of the present disclosure, the composite oxide body can be in a crystalline or non-crystalline structure, and the crystalline structure includes a stable state or a metastable state, wherein the weight ratio of the calcium oxide to the iron oxide is 3:1 to 1:1, and the weight ratio of the calcium oxide to the silica is 5:1 to 3:1.

More specifically, the calcium oxide is present in an amount of from 30 wt % to 50 wt %, the iron oxide is present in an amount of from 10 wt % to 35 wt %, and the silica is present in an amount of from 5 wt % to 20 wt %, based on the total weight of the porous material.

In other embodiments, the calcium oxide can be present in an amount of 30, 31, 32, 33, 34, 35, 36, 37, 38, 39, 40, 41, 42, 43, 44, 45, 46, 47, 48, 49 or 50 wt %, based on the total weight of the porous material; the iron oxide can be present in an amount of 10, 11, 12, 13, 14, 15, 16, 17, 18, 19, 20, 21, 22, 23, 24, 25, 26, 27, 28, 29, 30, 31, 32, 33, 34 or 35 wt %, based on the total weight of the porous material; and the silica can be present in an amount of 5, 6, 7, 8, 9, 10, 11, 12, 13, 14, 15, 16, 17, 18, 19 or 20 wt %, based on the total weight of the porous material.

In the present disclosure, the term "iron oxide" includes ferric oxide ($Fe_2O_3$), ferrous ferric oxide ($Fe_3O_4$), ferrous oxide (FeO), or a combination thereof.

In one embodiment, the composite oxide body can further include at least one metal oxide selected from the group consisting of alumina, magnesium oxide, titanium oxide, and manganese oxide, wherein the magnesium oxide is present in an amount of from 2 wt % to 10 wt %, the alumina is present in an amount of 2 wt % to 10 wt %, the titanium oxide is present in an amount of from 0.1 wt % to 5 wt %, and the manganese oxide is present in an amount of from 1 wt % to 5 wt %, based on the total weight of the porous material.

In other embodiments, the magnesium oxide can be present in an amount of 2, 3, 4, 5, 6, 7, 8, 9 or 10 wt %, based on the total weight of the porous material; the alumina can be present in an amount of 2, 3, 4, 5, 6, 7, 8, 9 or 10 wt %, based on the total weight of the porous material; the titanium oxide can be present in an amount of 0.1, 0.5, 1, 2, 3, 4 or 5 wt %, based on the total weight of the porous material; and the manganese oxide can be present in an amount of 1, 2, 3, 4 or 5 wt %, based on the total weight of the porous material.

In another embodiment, in addition to the multiple oxide components described above, the composite oxide body includes an iron alloy which further includes at least one element selected from the group consisting of calcium, silicon, magnesium, aluminum, titanium, carbon, sulfur, potassium, sodium and manganese. There are a plurality of different crystalline phases in the composite oxide body and a plurality alloys in the same crystalline phase due to the existence of composition of the iron-alloy. Comparing to general porous materials, the porous material of the present disclosure is more suitable to form inter-connecting channel structures with high aspect ratios in a mild process environment, and can be prepared with a decreased material cost; wherein the iron alloy includes an iron-silicon alloy.

Furthermore, the calcium oxide and the silica in the composite oxide body can be bonded to form calcium silicate. In still another embodiment, in addition to the multiple oxide components described above, the composite oxide body can include calcium carbonate, calcium sulfide, iron sulfide, or the combination thereof.

The "microchannel structures" are formed in the composite oxide body and extend to the surface of the composite oxide body. However, the metal oxide distributes throughout the composite oxide body, and would be reduced in situ through the pore-forming process of the present disclosure to release carbon dioxide and/or gas including vaporous water, and the like. Thus, the present disclosure does not intend to mean that the microchannel structures are formed initially at the interior, the core or the surface of the composite oxide body. In addition, the microchannel structures are different from each other in the channel shapes, channel diameter and size and distribution profiles, and the differences are not limited to the changes in channel diameter and size of a single main channel or a single branched channel.

With the microchannel structures, the porous material of the present disclosure provides high pore volume and specific surface area. Therefore, it can carry more active ingredients and increase its catalytic activity when being used as a catalyst. The porous material of the present disclosure can increase the surface area contacting with a fluid medium to increase adsorption or filtering effect when it is used as a filtering material or an adsorbent material. The porous material of the present disclosure makes the oxides in the composite oxide body more reactive in a combustion reaction, when it is used as an oxygen carrier for fuel. Meanwhile, the porous material of the present disclosure has good regeneration capability, and thus it has a long service life and a broad application prospect.

The distribution of the microchannel structures in the porous material and the morphology of the composite oxide body can be observed under a transmission electronic microscope (TEM) or a scanning electronic microscope (SEM), and the average channel diameter of the microchannel structures is also measured.

In one embodiment, main channels and branched channels extending from the main channels in a lateral direction and connecting to thereof are found through the observation of the distribution profile of the microchannel structures. The lateral direction refers to the transverse direction relative to the depth extending direction of the main channels or refers to the radical direction of the main channels, so that the main channels and the branched channels form a dendritic structure. In one example, the average channel diameter of the main channels is between 1 micron and 20 microns; the average channel diameter of the branched channels is between 50 nm and 150 nm. In another example, the main channels have an aspect ratio of from 3 to 20; wherein the average depth of the main channels is from 20 microns to 250 microns.

In other embodiments, the average channel diameter of the main channels can be 1, 2, 3, 4, 5, 6, 7, 8, 9, 10, 11, 12, 13, 14, 15, 16, 17, 18, 19 or 20 microns; the average channel diameter of the branched channels can be 50, 55, 60, 65, 70, 75, 80, 85, 90, 95, 100, 105, 110, 115, 120, 125, 130, 135, 140, 145 or 150 nm; the aspect ratio can be 3, 4, 5, 6, 7, 8, 9, 10, 11, 12, 13, 14, 15, 16, 17, 18, 19 or 20; and the average depth of the main channels can be 20, 30, 50, 70, 100, 130, 150, 170, 200, 230 or 250 microns.

Herein, the term "aspect ratio" refers to the ratio of depth to the diameter of a channel. A higher aspect ratio value indicates longer and narrower channel morphology.

In another embodiment, dense regions and loose regions are found through the observation of the morphology of the composite oxide body. It should be noted that the "loose region" refers to a region in which the microchannel structures in the composite oxide body are in a form of a sponge, and has a cross section (10 microns*10 microns) which the total pores area occupies more than 40% of the total area; in contrast, the "dense region" has a cross section (10 microns*10 microns) which the total pores area occupies less than 40% of the total area, and constitutes a main body for providing a strength for the porous material.

In one example, the dense region surrounds the loose region; wherein the dense region and the loose region change to each other uniformly and gradually and have no clear interface therebetween.

The volume ratio measurement of the microchannel structures distributed in the porous material can be analyzed by using a mercury porosimeter.

In one embodiment, the porous material has a porosity between 40% and 80%.

In other embodiments, the porous material can have a porosity of 40, 45, 50, 55, 60, 65, 70, 75 or 80%.

In one embodiment, at least 80% of the pore volume included in the main channels is from the channels having diameters in a range from 1 micron to 20 microns; and at least 80% of the pore volumes included in the branched channels is from the channels having diameters in a range from 50 nm to 150 nm.

In another embodiment, the main channels having diameters greater than 20 microns occupy less than 20% of the total volume of the channel structures; and the branched channels having diameters greater than 150 nm occupy less than 20% of the total volume of the channel structures.

Next, the preparation method of the porous material of the present disclosure is further described, which includes the steps of: performing pore-forming process for at least once including a reduction reaction on composite oxide powder including calcium oxide, iron oxide and silica at a temperature of 1,000° C. or below 1,000° C., wherein the reduction reaction is carried out by contacting the composite oxide powder with a reducing gas stream to form the porous material.

In one embodiment, the method for preparing a porous material of the present disclosure further includes the step of subjecting the composite oxide powder to an oxidation reaction before or after the reduction reaction, and the oxidation reaction is carried out by contacting the composite oxide powder with an oxidizing gas stream, but there is no restriction on the order for performing the oxidation and reduction reactions during the pore-forming process.

Comparing to conventional preparation methods of an inorganic porous material, the preparation method of the present disclosure employs composite oxides and thus can produce a plurality of microchannel structures having high aspect ratios and inter-connecting under mild process conditions without addition of any additive (e.g., pore-forming agent), so that the consumption of material cost is efficiently reduced, and the porous material prepared as such differs from conventional inorganic porous materials having pore structures on surface of the material. It can be seen that the preparation procedure of the present disclosure is simple and more environment friendly, generates no waste, and regards no residual carbon contamination in an article due to additives.

The term "composite oxide powder" refers to a single particle of the powder including multiple oxide components, wherein calcium oxide, iron oxide and silica are the essential components. It should be noted that the term "iron oxide" includes ferric oxide ($Fe_2O_3$), ferrous ferric oxide ($Fe_3O_4$), ferrous oxide (FeO), or a combination thereof.

In one embodiment, in addition to calcium oxide, iron oxide and silica, the composite oxide powder further includes at least one oxide or metal oxide selected from the group consisting of alumina, magnesium oxide, titanium oxide, manganese oxide, potassium oxide, sodium oxide, and phosphorus oxide.

In another embodiment, in addition to the oxides described above, the composite oxide powder can include an iron alloy which further includes at least one selected from the group consisting of calcium, silicon, magnesium, aluminum, titanium, carbon, sulfur, potassium, sodium and manganese.

In still another embodiment, in addition to oxides described above, the composite oxide powder can further include calcium carbonate, calcium silicate, calcium sulfide, iron sulfide, or the combination thereof.

In one example, an industrial byproduct can be chosen as the composite oxide powder to increase addition values of the industrial byproduct, particularly a byproduct generated from iron and steel smelting, with the blast-furnace slag, basic-oxygen-furnace slag or electric-arc-furnace slag being preferable.

In general, the byproducts generated from iron and steel smelting include composite oxides, iron alloys, silicates, phosphates, sulfides, carbonates, and other trace elements (e.g., manganese, copper, zinc, boron, cobalt). Among these, the composite oxides include calcium oxide, silica, iron oxides (including ferric oxide, ferrous ferric oxide, ferrous oxide, or a combination thereof), alumina, magnesium oxide, titanium oxide, manganese oxide, phosphorus oxide, and the like. The iron alloys include cementite ($Fe_3C$), iron sulfides (including ferrous disulfide, ferrous sulfide, or a combination thereof). The silicates include ferrous metasilicate ($FeSiO_3$), calcium silicate, manganese silicate ($MnSiO_3$). The phosphates include iron phosphate and calcium phosphate. The sulfides include calcium sulfide. And, the carbonates include calcium carbonate. Other byproducts also include calcium ferrite ($CaFe_2O_4$).

In one embodiment, the composition of the composite oxides in the industrial byproduct are present in the following proportional relationships: the weight ratio of the calcium oxide to the iron oxide is from 3:1 to 1:1, the weight ratio of the calcium oxide to the silica is from 5:1 to 3:1; more specifically, the calcium oxide is present from 30 wt % to 50 wt %, the iron oxide is present from 10 wt % to 35 wt %, and the silica is present from 5 wt % to 20 wt %, based on the total weight of the porous material.

In another embodiment, the composite oxide powder is screened to have a particle size within a range of from 0.1 mm to 2.5 mm, or 0.1 mm to 3 mm.

In the preparation method of the present disclosure, the oxidation reaction and the reduction reaction can be carried out in the same reactor or in different reactors. The "reactor" allows a reactant gas stream to be introduced into and to contact with the composite oxide powder sufficiently to perform the reactions described above, wherein gas-solid contacting manner of the reactant gas and the composite oxide powder includes: the composite oxide powder is subjected to be in reverse contact with the reactant gas stream, or the reactant gas stream is allowed to pass through a fixed bed layer composed of the composite oxide powder. Here, the actual reactor can employ a shaft furnace, a pot furnace, a fluidized bed reactor or a fixed bed reactor, without limitation on the form.

In one embodiment, the oxidizing gas stream has a gas hourly space velocity (GHSV) of 1 $hr^{-1}$ to 3,200 $hr^{-1}$, and the reducing gas stream has a GHSV of 1 $hr^{-1}$ to 800 $hr^{-1}$.

In the preparation method of the present disclosure, the pore-forming process is carried out under heating. Compared to the conventional processing technology, the oxidation and reduction reactions in the preparation method of the present disclosure are performed at a temperature no more than 1,000° C. and are mild and energy-saving preparation procedures; wherein the heating can be carried out by any well-known heating equipment for the reactor or by using a warmed reactant gas stream.

In another embodiment, the oxidation reaction is performed at a temperature of from 400° C. to 1,000° C. In other embodiments, the oxidation reaction can be performed at a temperature of 450, 500, 550, 600, 650, 700, 750, 800, 850, 900, or 950° C., but not limited thereto.

In another embodiment, the reduction reaction is performed at a temperature of 400° C. to 1,000° C. In other embodiments, the reduction reaction can be performed at a temperature of 450, 500, 550, 600, 650, 700, 750, 800, 850, 900, or 950° C., but not limited thereto.

The term "oxidizing gas" includes oxygen gas, oxygen-containing gas, or mixed gas including oxygen gas, wherein the oxygen-containing gas refers to a compound gas containing oxygen element, and specifically, the oxygen-containing gas can include water or ozone.

In one embodiment, the oxidizing gas stream is a mixed gas stream including oxygen gas, and the oxygen gas is included in the mixed stream gas at an amount of 1 vol % to 100 vol %.

In another embodiment, the oxidizing gas stream is air.

The term "reducing gas" refers to a gas capable of reducing a metal oxide, which can react with the oxygen in a metal oxide to allow the oxide to be reduced, and such reducing gas includes hydrogen gas, methane, ethane, propane, ethylene, carbon monoxide, or mixed gas containing such reducing gas.

In one embodiment, the reducing gas stream is a mixed gas including hydrogen gas, and the hydrogen gas is included in the mixed gas at an amount of 1 vol % to 4 vol %.

In another embodiment, the reducing gas stream is a mixed gas containing a hydrogen gas and a nitrogen gas, and the hydrogen gas is included in the mixed gas at an amount between 1 vol % and 4 vol % or between 96 vol % and 100 vol % to avoid the concentration range in which hydrogen gas would explode.

Figure 1:
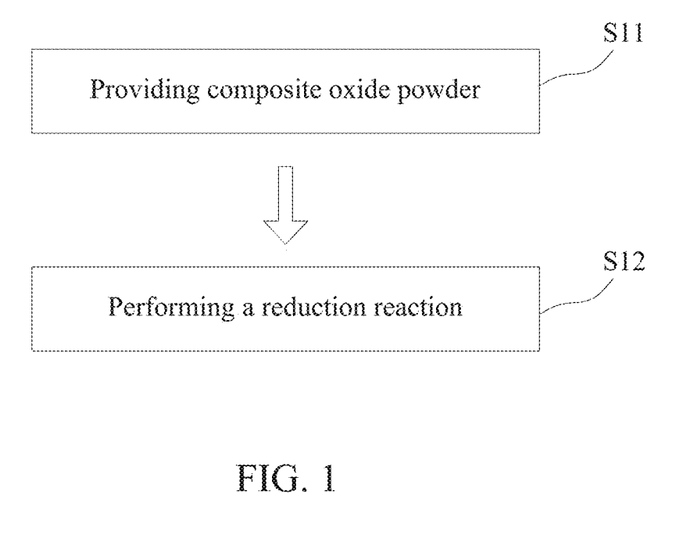
FIG. 1 is a flow chart of the preparation method of one example of the porous material of the present disclosure.

For the specific process flow of the preparation method of the present disclosure, referencing to FIG. 1 which illustrates an embodiment of a pore-forming process, the preparation method includes the following steps: providing composite oxide powder in a reactor (Step S11); then, allowing a reducing gas to be in contact with the composite oxide powder for reduction reaction (Step S12), thereby obtaining a porous material.

Figure 2:
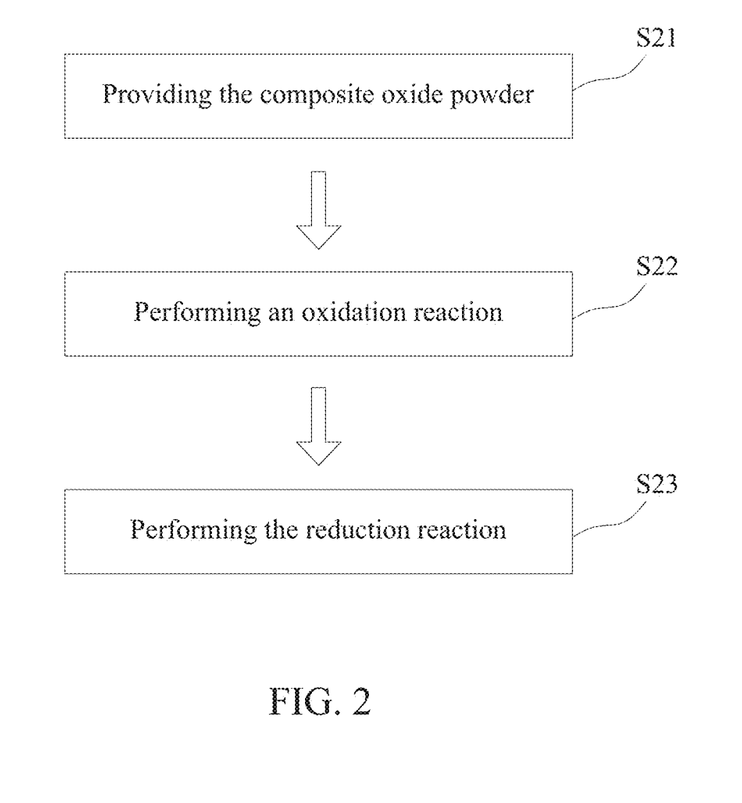
FIG. 2 is a flow chart of the preparation method of another example of the porous material of the present disclosure.

Referencing to FIG. 2 which illustrates another embodiment of a pore-forming process, the preparation method includes the following steps of: first, providing composite oxide powder in a reactor (Step S21); then, allowing an oxidizing gas to be in contact with the composite oxide powder for an oxidation reaction (Step S22); and after the oxidation reaction is completed, allowing a reducing gas to be in contact with the composite oxide powder for reaction (Step S23), thereby obtaining a porous material.

In still another embodiment, the preparation method of the present disclosure can repeat pore-forming process cycle of the oxidation reaction (Step S22) and the reduction reaction (Step S23), and the number of the pore-forming process cycle should be no more than 5 times.

In the preparation method of the present disclosure, the conversion degree of the oxidation reaction procedure reach 50% or above, most preferably 80% to 100% of the theoretical conversion rate in a complete reaction. Also, the conversion degree of the reduction reaction procedure reaches 50% or above, most preferably 80% to 100% of the theoretical conversion rate in a complete reaction.

In another embodiment, the oxidation reaction in step S22 is performed at 400° C. to 1,000° C., until the conversion degree reaches more than 50% of the theoretical conversion rate in a complete reaction, then the reaction stops.

In another embodiment, the oxidation reaction is performed at 400° C. to 1,000° C. for 0.3 hours to 24 hours.

In other embodiments, the oxidation reaction can be performed for 0.5, 1, 2, 4, 6, 8, 10, 12, 14, 16, 18, 20, 22, or 24 hours.

In another aspect, the reduction reaction in step S23 is performed at 400° C. to 1,000° C. until the conversion degree reached more than 50% of the theoretical conversion rate in a complete reaction, then the reaction stops.

In another embodiment, the reduction reaction is performed at 400° C. to 1,000° C. for 0.3 hours to 24 hours.

In other embodiments, the reduction reaction can be performed for 0.5, 1, 2, 4, 6, 8, 10, 12, 14, 16, 18, 20, 22, or 24 hours.

Furthermore, during the alternate repeating and cycling of the oxidation reaction and the reduction reaction, an inert gas can be introduced for a certain period to completely remove the residual gas from the previous reaction in the composite oxide powder within the reactor.

The present disclosure will be described in detail through Examples which are not considered to limit the scope of the present disclosure.

EXAMPLES

Figure 3A:
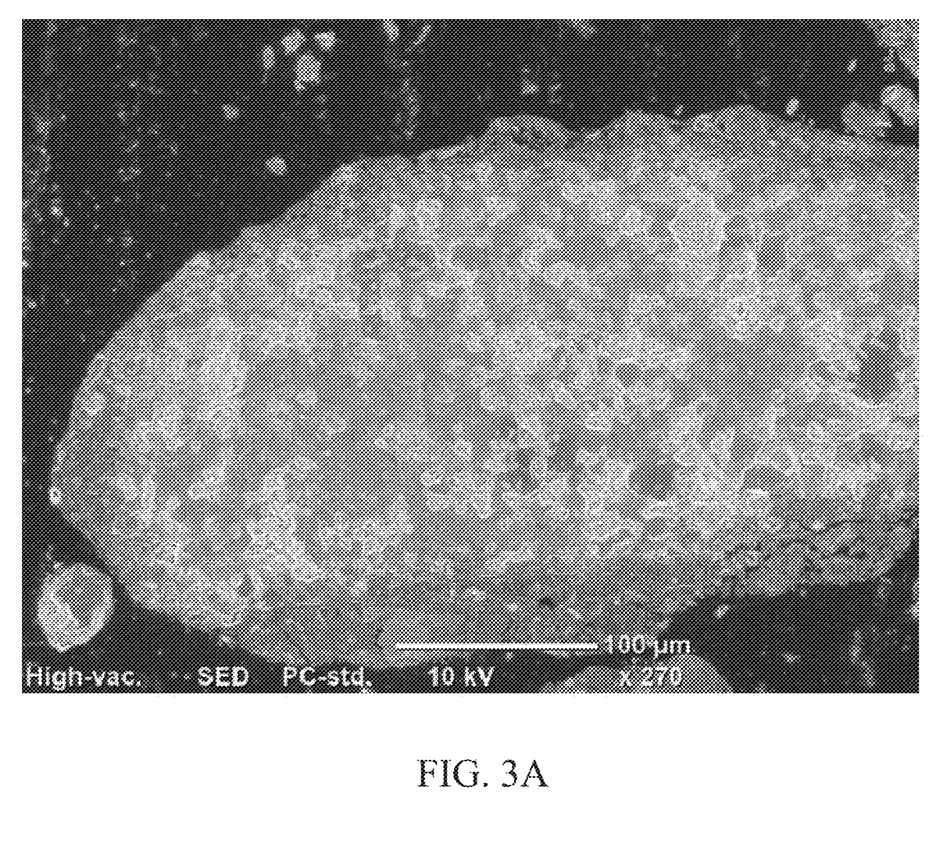
FIG. 3A is a cross-sectional view of a basic-oxygen-furnace slag powder, as raw material, detected with a scanning electronic microscope.
Figure 3B:
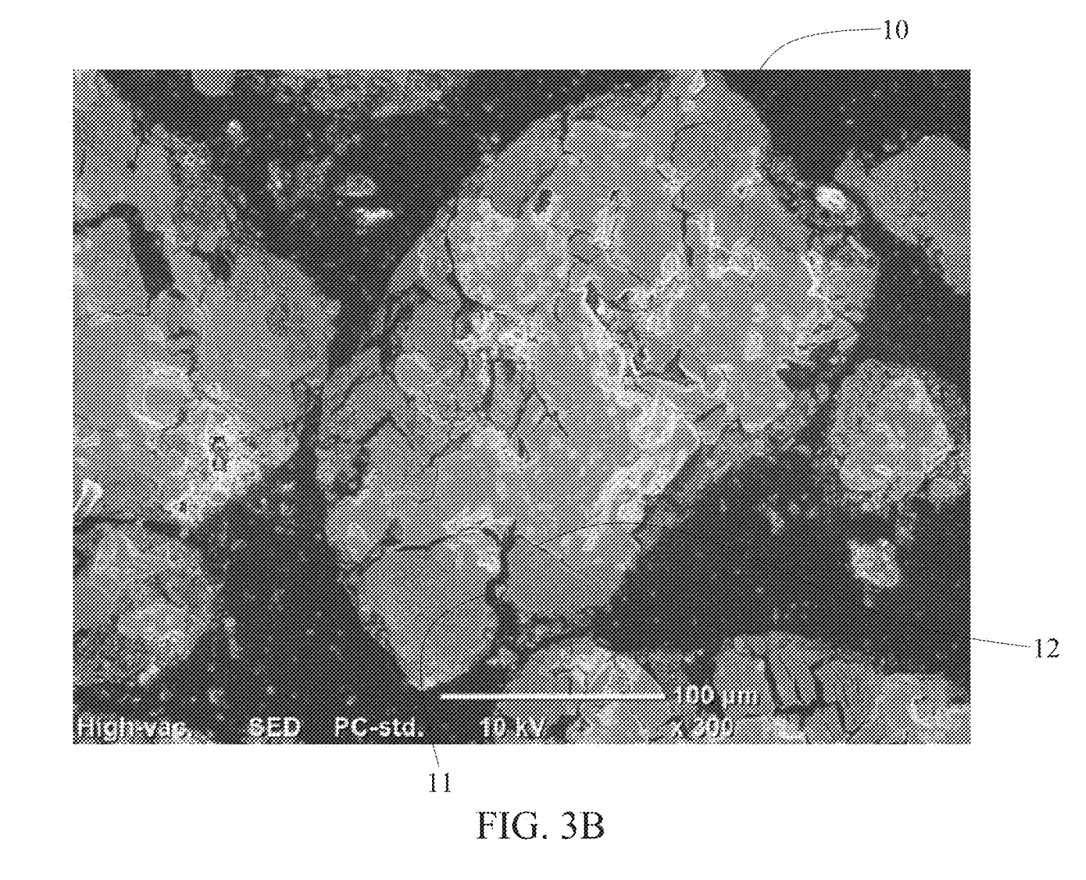
FIG. 3B is a cross-sectional view of the porous material of Example 1 of the present disclosure detected with a scanning electronic microscope.

Example 1: Preparation of a Porous Material 4 grams of basic-oxygen-furnace slag powder with particle size of from 0.1 to 0.3 mm was placed in a high temperature reactor as the raw material, and oxygen gas was introduced for oxidation reaction under the conditions of an atmospheric pressure and a temperature of 950° C. After the oxidation reaction was performed for 2 hours, a mixed gas of 4% hydrogen in nitrogen gas was introduced for reduction reaction. After the reduction reaction was performed for 2 hours, a porous material was obtained. Then, the porous material sample was embedded in a resin, cured, sectioned, polished, and examined under a scanning electron microscope for the morphological change of sections of the basic-oxygen-furnace slag powder, before the oxidation and reductions reactions were performed and after the porous material was formed, as shown in FIGS. 3A and 3B. As can be seen in FIG. 3B, the porous material includes a composite oxide body 10 and a plurality of microchannel structures, wherein each of the plurality of microchannel structures includes main channels 11 and branched channels 12 extending in a lateral direction from and connecting to the main channels 11.

Example 2: Preparation of the Porous Material

Figure 4A:
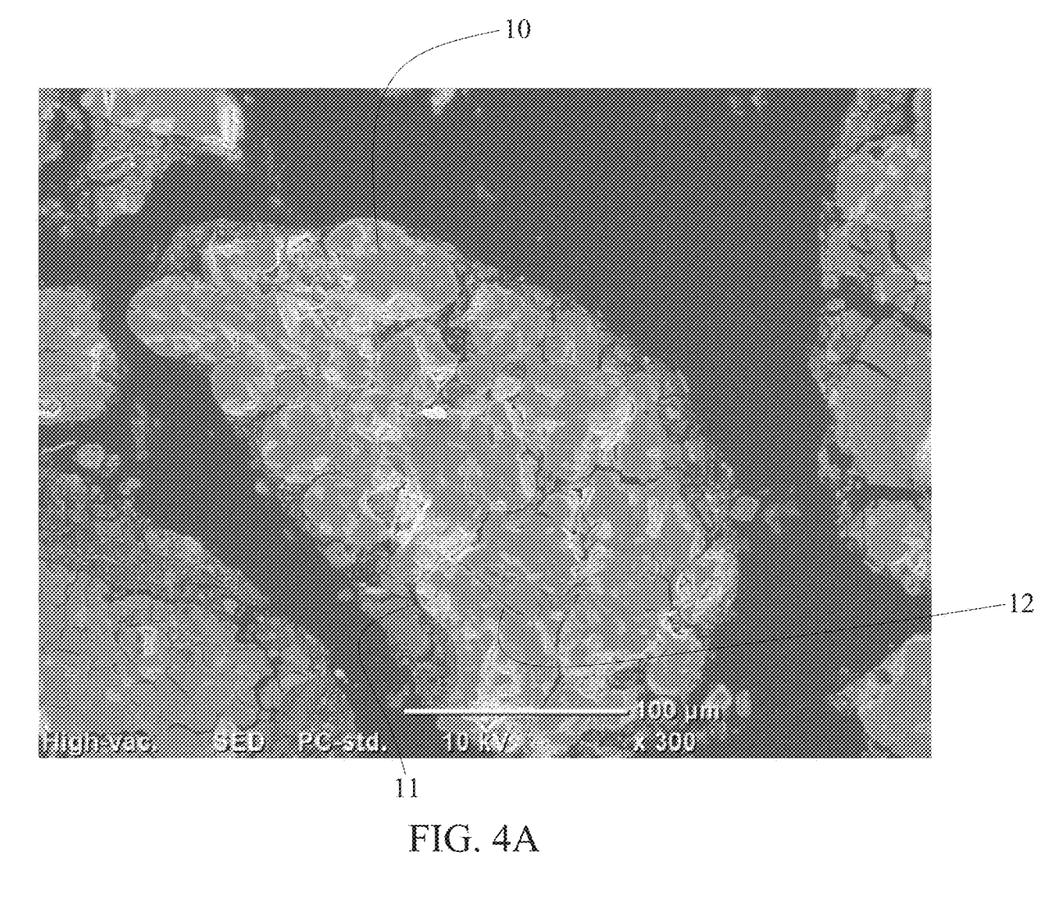
FIG. 4A is a cross-sectional view of the porous material of Example 2 of the present disclosure detected with a scanning electronic microscope.
Figure 4B:
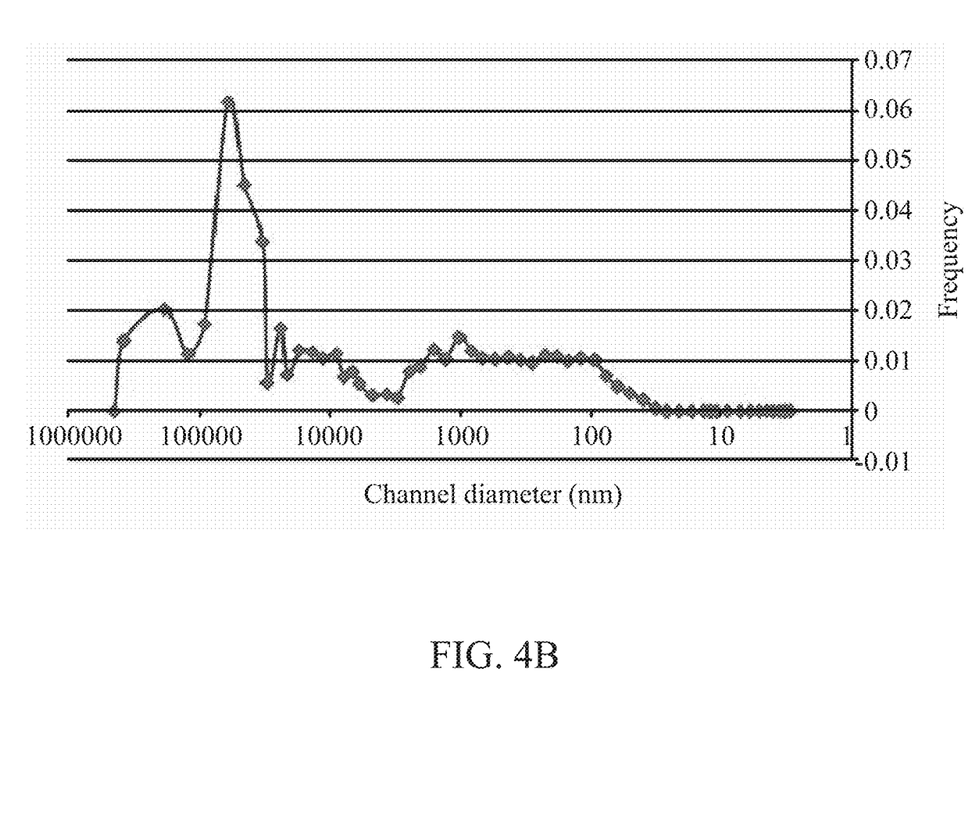
FIG. 4B is a graph showing the channel diameter distribution of the porous material of Example 2 measured with a mercury porosimeter.

A porous material was prepared by the same method as described in Example 1 except that the pore-forming process cycle of the oxidation reaction and the reduction reaction was repeated for another one time, and was examined under a scanning electron microscope for the microchannel structure of the cross section and through a mercury porosimeter (Micromeritics Autopore 9520) for the channel diameter distribution, respectively, and the results were recorded in Table 1 and FIGS. 4A and 4B. As can be seen in FIG. 4A, the porous material includes a composite oxide body 10 and a plurality of microchannel structures, wherein each of the plurality of microchannel structures includes a main channel 11 and branched channels 12 extending in a lateral direction from and connecting to the main channels 11.

TABLE 1

|  | Measured Value |
| --- | --- |
| Volume mean channel diameter (nm) | 16110.9 |
| Area mean channel diameter (nm) | 125.9 |
| Average channel diameter (nm) | 639.3 |
| Porosity (%) | 63.8449% |

Example 3: Preparation of the Porous Material

Figure 5:
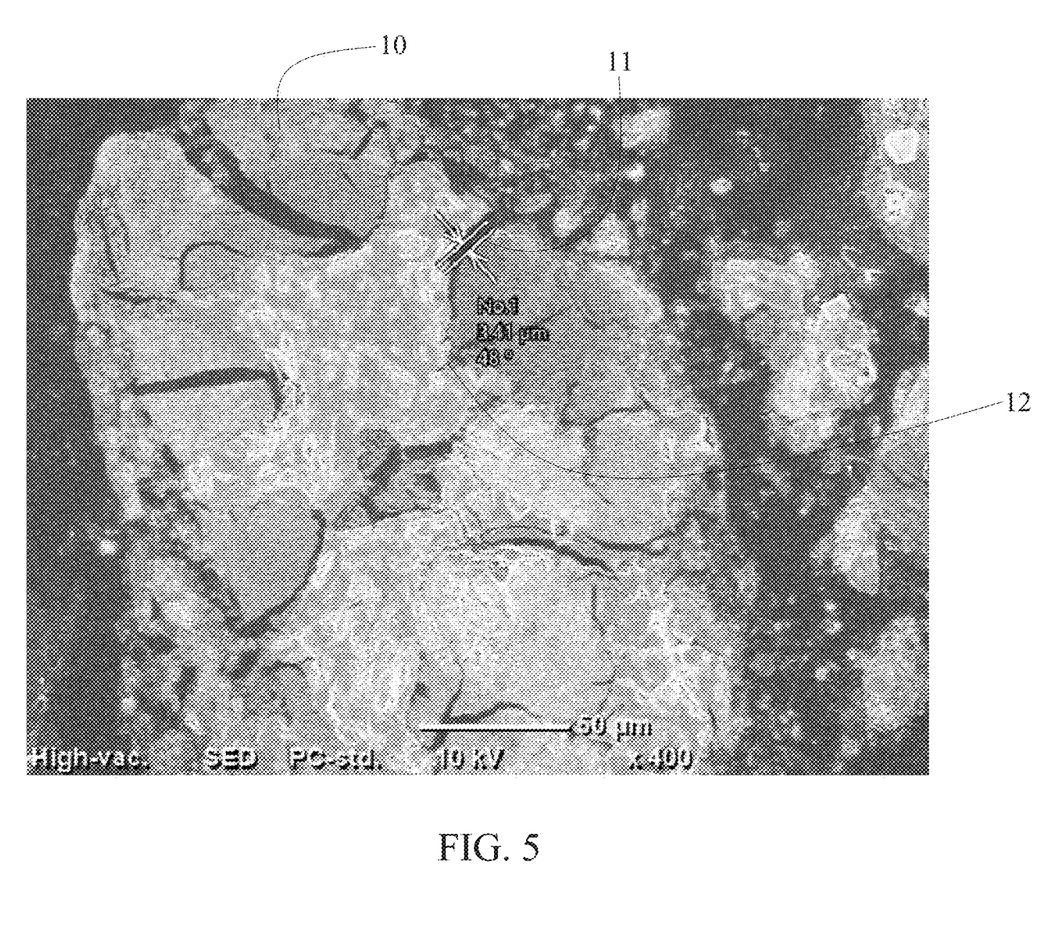
FIG. 5 is a cross-sectional view of the porous material of Example 3 of the present disclosure detected with a scanning electronic microscope.

A porous material was prepared by the same method as described in Example 1 except that the pore-forming process cycle of the oxidation reaction and the reduction reaction was repeated for another two times, and was examined under a scanning electron microscope for the microchannel structure of the cross section, as shown in FIG. 5. As can be seen in FIG. 5, the porous material includes a composite oxide body 10 and a plurality of microchannel structures, wherein each of the plurality of microchannel structures includes a main channel 11 and branched channels 12 extending in a lateral direction from and connecting to the main channels 11.

Example 4: Preparation of the Porous Material

Figure 6:
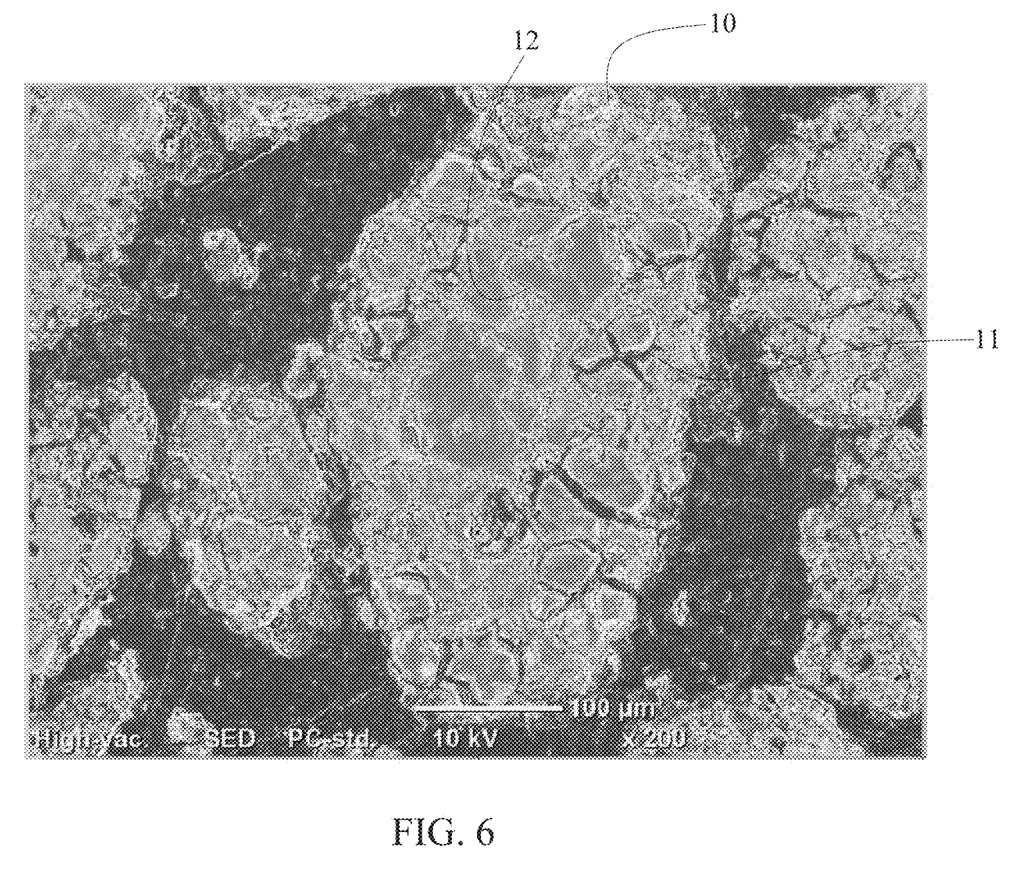
FIG. 6 is a cross-sectional view of the porous material of Example 4 of the present disclosure detected with a scanning electronic microscope.

A porous material was prepared by the same method as described in Example 1 except that only the processing of the reduction reaction was performed for one time, and was examined under a scanning electron microscope for the microchannel structure of the cross section, as shown in FIG. 6. As can be seen in FIG. 6, the porous material includes a composite oxide body 10 and a plurality of microchannel structures, wherein each of the plurality of microchannel structures includes a main channel 11 and branched channels 12 extending in a lateral direction from and connecting to the main channels 11.

In conclusion, with the method of the present disclosure, the porous material prepared has the characteristics including inter-connecting microchannel structures, a high porosity and a large specific surface area through choosing the composite oxide powder and controlling the reduction reaction (or including the oxidation reaction) to adjust the morphology of the microchannel structures and the channel diameter distribution thereof without using any additive, thereby enhancing the efficacy of the porous material in many fields as a catalyst, a filtering material, an absorbent, a carrier for fuel, and so on.

In another aspect, the method for preparing the porous material of the present disclosure is a low temperature process without using any additive for pore-forming, thereby reducing cost consumption of the material efficiently. The process has a simple preparation procedure, is environment friendly and cost effective, and has no residual carbon contamination concern due to additives, therefore it has the value of industrial applicability.

The above Examples are used for illustration only but not for limiting the present disclosure. Modifications and alterations can be made to above Examples by anyone skilled in the art without departing from the spirit and scope of the present disclosure. Therefore, the range claimed by the present disclosure should be defined by appended claims and should be encompassed within the disclosure of the present disclosure as long as that does not influence effects and purposes of the present disclosure.

What is claimed is:

1. A porous material, comprising:
   a composite oxide body comprising calcium oxide, iron oxide and silica; and
   a plurality of microchannel structures formed in the composite oxide body and extending to a surface of the composite oxide body, wherein each of the microchannel structures comprises main channels and branched channels extending from the main channels in a lateral direction and connecting thereto, wherein the main channels have an average channel diameter larger than those of the branched channels.

2. The porous material of claim 1, wherein the main channels have an average channel diameter between 1 micron and 20 microns, and the branched channels have an average channel diameter between 50 nm and 150 nm.

3. The porous material of claim 1, wherein the main channels have an aspect ratio of from 3 to 20.

4. The porous material of claim 1, wherein the main channels have an average depth of from 20 microns to 250 microns.

5. The porous material of claim 1, which has a porosity between 40% and 80%.

6. The porous material of claim 1, wherein the composite oxide body further comprises an iron alloy, and the iron alloy further comprises at least one element selected from the group consisting of calcium, silicon, magnesium, aluminum, titanium, carbon, sulfur, potassium, sodium and manganese.

7. The porous material of claim 6, wherein the iron alloy is an iron-silicon alloy.

8. The porous material of claim 1, wherein the calcium oxide is from 30 wt % to 50 wt %, the iron oxide is from 10 wt % to 35 wt %, and the silica is from 5 wt % to 20 wt %, on a basis of a total weight of the porous material.

9. The porous material of claim 1, wherein the composite oxide body further comprises at least one metal oxide selected from the group consisting of alumina, magnesium oxide, titanium oxide, and manganese oxide.

10. The porous material of claim 9, wherein the magnesium oxide is from 2 wt % to 10 wt %, the alumina is from 2 wt % to 10 wt %, the titanium oxide is from 0.1 wt % to 5 wt %, and the manganese oxide is from 1 wt % to 5 wt %, on a basis of a total weight of the porous material.

11. The porous material of claim 1, wherein a weight ratio of the calcium oxide to the iron oxide is from 3:1 to 1:1, and a weight ratio of the calcium oxide to the silica is from 5:1 to 3:1.

12. A method for preparing a porous material of claim 1, comprising:
    performing a pore-forming process for at least once, the pore-forming process comprising a reduction reaction on composite oxide powder comprising calcium oxide, iron oxide and silica at a temperature of 1,000° C. or below 1,000° C., wherein the reduction reaction is carried out by contacting the composite oxide powder with a reducing gas stream to form the porous material.

13. The method of claim 12, wherein the composite oxide powder is an industrial byproduct.

14. The method of claim 13, wherein the industrial byproduct is blast-furnace slag, basic-oxygen-furnace slag, electric-arc-furnace slag, or a combination thereof.

15. The method of claim 12, wherein the reducing gas stream has a reducing gas selected from hydrogen gas, methane, ethane, propane, carbon monoxide, or a combination thereof.

16. The method of claim 12, wherein the reduction reaction is performed at a temperature of 400° C. to 1,000° C. for 0.3 hours to 24 hours.

17. The method of claim 12, wherein the pore-forming process further comprises subjecting the composite oxide powder to an oxidation reaction before or after the reduction reaction, and the oxidation reaction is carried out by contacting the composite oxide powder with an oxidizing gas stream.

18. The method of claim 17, wherein the oxidizing gas stream has a gas hourly space velocity of 1 $hr^{-1}$ to 3,200 $hr^{-1}$, and the reducing gas stream has a gas hourly space velocity of 1 $hr^{-1}$ to 800 $hr^{-1}$.

19. The method of claim 17, wherein the oxidation reaction is performed at a temperature of 400° C. to 1,000° C. for 0.3 hours to 24 hours.

20. The method of claim 17, further comprising repeating a pore-forming process cycle of the oxidation reaction and the reduction reaction, wherein a number of the pore-forming process cycle is not beyond five.

* * * * *